United States Patent [19]
Dreyer

[11] Patent Number: 5,692,822
[45] Date of Patent: Dec. 2, 1997

[54] UNIFORM BI-DIRECTIONAL DEPENDENT LINE LIGHT SOURCE VIA CONTROLLED PARTIAL REFLECTION

[75] Inventor: John F. Dreyer, North Oaks, Minn.

[73] Assignee: Minnesota Mining & Manufacturing Co., St. Paul, Minn.

[21] Appl. No.: 564,786

[22] Filed: Nov. 29, 1995

[51] Int. Cl.$^6$ ........................................... F21V 7/04
[52] U.S. Cl. .................. 362/32; 362/27; 362/245
[58] Field of Search ............................. 362/26, 27, 32, 362/242, 243, 244, 245

[56] References Cited

U.S. PATENT DOCUMENTS

| | | | |
|---|---|---|---|
| 3,383,675 | 5/1968 | Allardice et al. | 340/321 |
| 4,260,220 | 4/1981 | Whitehead | 350/96.28 |
| 4,615,579 | 10/1986 | Whitehead | 350/96.1 |
| 4,662,728 | 5/1987 | Whitehead | 350/573 |
| 4,744,013 | 5/1988 | Lee et al. | 362/109 |
| 4,750,798 | 6/1988 | Whitehead | 350/96.1 |
| 4,782,433 | 11/1988 | Rombough | 362/186 |
| 4,787,708 | 11/1988 | Whitehead | 350/96.28 |
| 4,805,984 | 2/1989 | Cobb, Jr. | 350/96.28 |
| 4,850,665 | 7/1989 | Whitehead | 350/96.1 |
| 4,890,203 | 12/1989 | Watson | 362/102 |
| 4,906,070 | 3/1990 | Cobb, Jr. | 350/286 |
| 4,996,632 | 2/1991 | Aikens | 362/32 |
| 5,016,143 | 5/1991 | Aikens | 362/32 |
| 5,043,850 | 8/1991 | Dreyer, Jr. | 362/26 |
| 5,056,892 | 10/1991 | Cobb, Jr. | 359/831 |
| 5,117,478 | 5/1992 | Cobb, Jr. et al. | 385/133 |
| 5,258,896 | 11/1993 | Dreyer, Jr. | 362/307 |

*Primary Examiner*—Stephen F. Husar
*Attorney, Agent, or Firm*—Gary L. Griswold; David R. Cleveland; Stephen W. Buckingham

[57] ABSTRACT

A bi-directional line light source having an improved uniformity of brightness along the length of the line light source is achieved using partial reflectors within the line light source. Partial reflectors reflect a portion of incident light and transmit the remaining light. The reflected light from a first light source supplements light from a second light source. Similarly, reflected light from the second light source supplements light from the first light source.

7 Claims, 5 Drawing Sheets

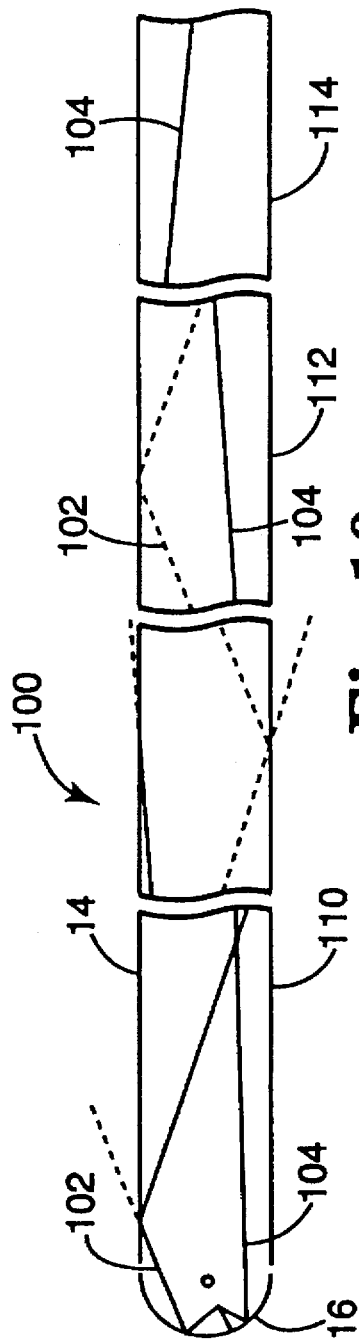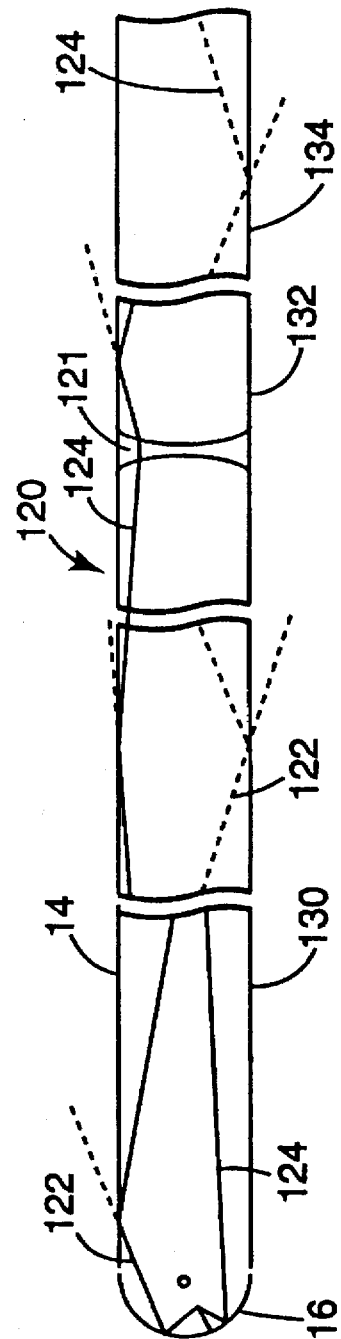

UNIFORM BI-DIRECTIONAL DEPENDENT LINE LIGHT SOURCE VIA CONTROLLED PARTIAL REFLECTION

FIELD OF THE INVENTION

The present invention relates generally to light sources which employ light conduits operating on the principle of total internal reflection. More specifically, the present invention relates to promoting greater uniformity of brightness in such directionally dependent line light sources.

BACKGROUND OF THE INVENTION

Light sources used in traffic and navigational control are generally point or near-point sources. Common examples include semaphores and hazard lights commonly placed around road construction areas.

More recently line light sources have been introduced in traffic control and hazard conspicuity applications. The apparent brightness of such directionally dependent line light sources are highly dependent on the viewing angle with respect to the light conduit. An exemplary line light source, disclosed in U.S. Pat. No. 5,043,850 (Dreyer, Jr.), employs a light conduit of the type disclosed in U.S. Pat. No. 4,805,984 (Cobb, Jr.). Two light sources differing in at least one optical property are optically coupled to opposing ends of the light conduit. The light is emitted from the light conduit in directions such that the light will appear brightest to a person looking along the conduit. If the optical property which differs is color, the light conduit will appear a first color when viewed from one direction and a second color when viewed from the opposite direction. An additional line light source is disclosed in U.S. Pat. No. 5,258,896 (Dreyer, Jr.).

A related type of product is produced when only a single lamp is utilized. When such a structure is constructed, the line source will be visible to a person looking along the light conduit in a direction toward the light source, but will not be readily apparent to a person looking along the light conduit away from the light source.

A problem that arises in such directionally dependent line light sources, both unidirectional and bi-directional, arises due to the attenuation of light over the length of the light conduit. Light conduits, as described above, do not generate light in addition to the light provided by the light source at one or both ends of the light conduit, but rather only emit that light. When light is emitted in sections of the light conduit that are closer to the light source, the emitted light leaves less light available for the light conduit to transport and to emit in sections of the light conduit that are further from the light source. This attenuation of light over the length of the light conduit causes nonuniformity of light emission over the length of the light conduit, the light conduit appearing brighter in sections closer to the light source and appearing dimmer in sections further from the light source. This contrast in brightness limits the desired distance between light sources when a uniform brightness is necessary, thereby requiring more light sources to generate more light and increasing the cost of the system. The contrast is particularly evident in highway applications where multiple line light sources are positioned end to end. When two or more line light sources are placed end to end, the dimmest section of a first line light source abuts the brightest section of the adjacent line light source.

Many methods are known in the art for improving the uniformity of light emission in unidirectional light conduits. These methods improve uniformity by increasing the exitance of light in the sections of the light conduit furthest from the light source and decrease the exitance in the sections of the light conduit closest to the light source. For example, diffusive reflectors can be placed inside the light conduit in sections of the light conduit furthest from light source to extract light from the light conduit at a rate higher than if no diffusive reflectors were present. Another method of increasing the exitance of light is by introducing imperfections in the totally internally reflecting surfaces of the light conduit, such as by abrading the prismatic structured surface, to allow more light to transmit rather than totally internally reflect off the abraded surface. Yet another method of increasing the exitance of light is by coating the light conduit surface with a material of a different refractive index, thereby increasing the transmission of light.

The prior art methods of increasing light exitance, however, increase the exitance of light from the light conduit regardless of the direction in which the light is traveling. Thus, these methods cannot be used to increase the exitance of light at the darker end of a bi-directional light conduit for light traveling in a first direction without also increasing the brightness of the brighter end of the light conduit for light traveling in the opposite direction. Therefore, there is a need in the art for a method of increasing the exitance of light in a light conduit that increased the exitance more for light traveling in a first direction than for light traveling in the opposite direction. Further, many prior art methods of light extraction drastically change the angle of the light within the light conduit such that the light exits the light conduit because it approaches the prisms of the structured film at less than the critical angle. This change in angle, however, destroys a desired property of the light conduit because it changes the exit angle of the light from the light conduit, thereby destroying the directionality.

Light conduits have been placed on the side of roads and other highway applications to facilitate roadway demarcation. Because the length of necessary light conduits for roadway applications are often very long, i.e. hundreds of meters in length, the light conduits are preferably shipped in shorter lengths, such as twenty foot (6.1 meters) sections to installation sites. The sections of the light conduit are typically made of a substantially optically transparent material. When the light conduit sections are shipped, it is preferable to seal the sections to protect them from the elements, such as moisture and dirt, which would impair the performance of the light conduit. In the prior art, it has been imperative that these sealing windows maximize transmission of light to maximize brightness in the light conduit. To achieve maximum transmission, anti-reflective coating has been applied to the sealing windows.

The uniformity of light emission from the light conduit is further decreased due to condensation in the light conduit. The lamp from the light source generates heat, thereby creating a temperature differential between the end of the light conduit near the light source and the rest of the light conduit. This temperature differential creates an airflow within the light conduit. Air near the light source is heated and rises to the top of the light conduit, where it flows along the inside top of the conduit, away from the light source until it cools and settles toward the bottom of the conduit. Similarly, the cool air flows along the inside bottom of the conduit, toward the light source to replace the warmer air leaving the light source area, as described above. Any moisture that leaks into the light conduit or that has been trapped within the conduit is dissolved in the air. As the warm air flows away from the light source and cools, it sheds the moisture in the air in the form of condensation in the top of the conduit, a few feet (approximately one meter) from the light source. In colder climates, the moisture further crystallizes in the form of ice. The condensation or ice crystals scatter incident light, thereby causing light to approach the structured film at less than the critical angle that is necessary to transport the light.

Condensation can be eliminated by filling the light conduit with dry gas and sealing the conduit. Because it is impractical to fill the light conduit and seal it at the installation site, it would be preferred to perform these tasks at the factory and ship the light conduit with the sealed dry gas inside. Shipping a 100 foot (30 meter) intact section of a light conduit causes logistical problems and can be cost prohibitive. While sealed sections of 10 feet (3 meters) may be shipped, the number of sealing windows, such as 20 in a 200 foot (61 meters) system, causes enough light loss to prevent sections furthest from the light sources from emitting an adequate amount of light. As mentioned earlier, anti-reflective coatings facilitate better transmission of light through the sealing windows, but are expensive to implement.

SUMMARY OF THE INVENTION

The present invention improves the uniformity of light transmission from both unidirectional and bi-directional line light sources through directional light leakage. A bi-directional line light source has light injector assemblies at both ends of a light conduit, the light conduit formed of a thin, flexible polymeric optical film having a smooth surface and a structured surface. The structured surface includes linear array of substantially right angled isosceles prisms arranged side by side. The structured surface and the optical properties of the material chosen produce total internal reflection of light. More specifically, the structured surface transports the majority of incident light through total internal reflection and emits the remaining light at substantially the same angle of incidence as that at which it strikes the light conduit.

Directional light leakage, that is increasing or decreasing the amount of emitted light in substantially the same direction as that at which it strikes the light conduit, is achieved by increasing or decreasing the frequency in which light rays strike the inner walls of the light conduit. In a first embodiment, this is achieved by placing lenses in sections of a light conduit where less light transmission is necessary to decrease brightness to achieve uniform brightness along the length of the light conduit. The lenses are preferably used near the light source to cause the collimated beam to strike the inner wall of the light conduit less often in sections of the light conduit that are normally too bright, thereby reducing the amount of emitted light. Conversely, lenses may be placed in sections of the light conduit where more light emission is desired. These lenses can re-collimate a converging beam or may cause a collimated beam to diverge, thereby increasing the frequency in which the light strikes the inner wall of the light conduit.

In another embodiment of the present invention, refractive or reflective elements are introduced within the light conduit to slightly change the angular distribution of incident light. These refractive or reflective elements are preferably placed in sections of the light conduit where light rays having a greater angle with respect to the longitudinal axis have been depleted and light rays having a shallow angle with respect to the longitudinal axis remain in the light conduit. The refractive or reflective elements slightly change the angular distribution of incident light to increase the frequency at which the incident light will strike the inner walls of the light conduit, thereby increasing emission of light and increasing the efficient use of available light.

In yet another embodiment of the present invention, partial reflectors are used to provide supplemental emitted light in sections of a bi-directional line light source that are normally dim with respect to the rest of the line light source. The partial reflectors partially reflect light from a first light injector assembly at a first end of the light conduit to supplement the depleted light originating from the second light injector assembly at the opposite end of the light conduit. Similarly, a partial reflector is placed at the second end of the light conduit to provide supplemental light for light originating from the first light injector assembly.

BRIEF DESCRIPTION OF THE DRAWINGS

The present invention will be more fully described with reference to the accompanying drawings wherein like reference numerals identify corresponding components, and:

FIG. 10 is a side cross-sectional view of sections of a prior art line light source, illustrating light depletion of light rays emitted from the light injector assembly at greater angles with respect to the longitudinal axis of the line light source;

FIG. 11 is a side cross-sectional view of sections of a line light source of the present invention, illustrating slight change of angular distribution of light rays emitted from the light injector assembly at shallow angles with respect to the longitudinal axis of the line light source;

DETAILED DESCRIPTION OF A PREFERRED EMBODIMENT

In the following detailed description of the preferred embodiment, reference is made to the accompanying drawings which form a part hereof, and in which is shown by way of illustration of a specific embodiment of which the invention may be practiced. It is to be understood that other embodiments may be utilized and structural changes may be made without departing from the scope of the present invention.

Figure 1:
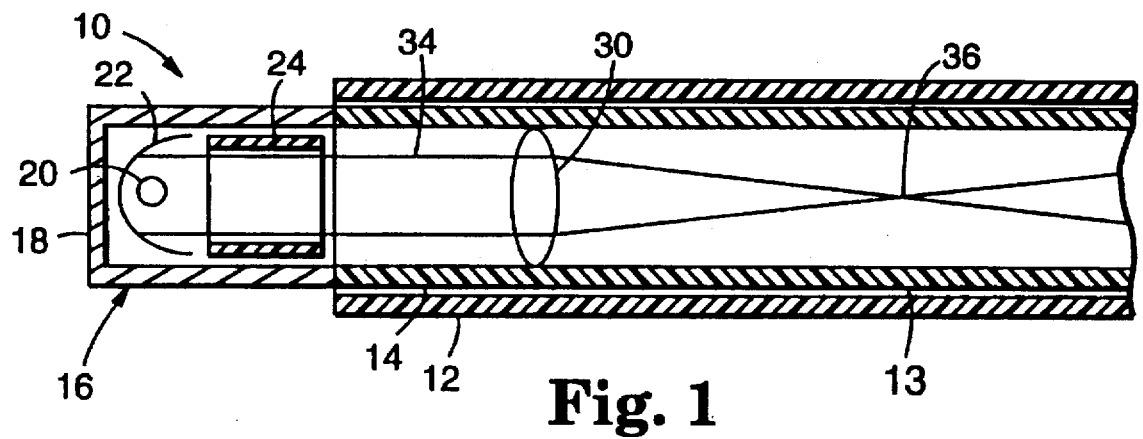
FIG. 1 shows a side cross-sectional view of an embodiment of the present invention.
Figure 2:
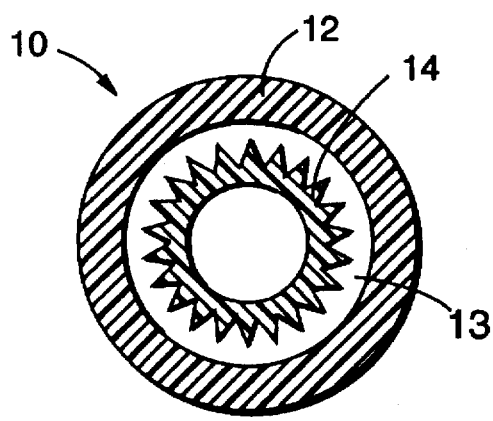
FIG. 2 shows an end cross-sectional view of the embodiment of the present invention shown in FIG. 1.

The present invention discloses methods and apparatuses that promote greater uniformity in directionally dependent line light sources using the principles of reflection and refraction within the light conduit. FIG. 1 is a side cross sectional view of one embodiment of the invention, designated as line light source 10 and FIG. 2 is an end cross sectional view of the same embodiment of the invention. The embodiment as shown comprises a light injector assembly 16 and a light distribution assembly comprising two generally cylindrical hollow members having a common longitudinal axis, i.e., one within the other such that in cross-section, they are circular and concentric. The outer member is a strong, substantially optically transparent protective cover 12, and while it is preferred, it is not required. The inner member is a substantially optically transparent, totally internally reflecting thin film light conduit 14. As used herein, the term 'optically transparent' is used broadly to describe materials which transmit light without significant absorption. Specifically, as used herein, the term 'optically transparent' shall not exclude materials which transmit specific wavelengths of light, and which thereby appear colored to the eye of an observer but are transparent to the wavelengths of interest in a particular application. The diameter of cover 12 may be large enough to create an airspace 13 between cover 12 and light conduit 14, but this also is not required.

In one embodiment of the present invention, cover 12 is a substantially optically transparent cylindrical tube preferably formed from a dielectric acrylic or polymeric material such as polyurethanes, polystyrenes, and polyvinylchlorides. In a preferred embodiment the tube comprises a polycarbonate matrix. It will be appreciated, however, that cover 12 could be of a different shape or a different material to accommodate different applications. For example, in certain signing applications it may be desirable for only a portion of the cover 12 to comprise a substantially optically transparent polymeric material.

Light conduit 14 comprises a longitudinal hollow structure preferably made from a substantially optically transparent dielectric material, as taught in U.S. Pat. No. 4,805,984 (Cobb, Jr.,). The hollow structure is formed of a thin, flexible polymeric film having a smooth surface (the inner side as shown in FIG. 2) and a structured outer surface. A suitable film for light conduit 14 is the 3M Optical Lighting Film commercially available from the Minnesota Mining and Manufacturing Company of St. Paul, Minn. and described in U.S. Pat. No. 4,906,070 (Cobb, Jr.). A preferred structured surface includes a linear array of substantially right angled isosceles prisms arranged side by side. The perpendicular sides of each prism make an angle of approximately 45° with the tangent to the adjacent smooth surface opposite the structured surface. While right angled isosceles prisms are preferred, other isosceles prisms may be used, such as those disclosed in commonly assigned U.S. patent application Ser. No. 08/544,775, entitled "Totally Internally Reflecting Light Conduit", flied Oct. 17, 1995 (Dreyer), now abandoned. While the prisms totally internally reflect (TIR) the majority of incident light, thereby transporting light along the light conduit, light that approaches the prism surface at less than the critical angle as well as some light striking imperfections in the light conduit will be emitted from light conduit 14. In one construction, the prisms extend longitudinally along the length of the outer surface of light conduit 14. However, it will be appreciated that the prisms may extend along the longitudinal axis of light conduit 14 in a helical fashion, as disclosed in commonly assigned U.S. Pat. No. 5,363,470 to Wortman, which further facilitates light emission from the light conduit.

The preferred light conduit 14 is made from a material which must be substantially optically transparent, and preferably is flexible, homogeneous, and isotropic. Suitable materials include commercially available acrylics and polycarbonates having nominal indices of refraction of 1.49 and 1.58, respectively. Other possible materials, selected to provide the required functionality, include polyurethanes, polystryrenes, and polyvinylchlorides. Generally, polycarbonates are preferred for their relatively high indices of refraction and physical properties.

A suitable thickness of film used for light conduit 14 is about 0.38 millimeters, measured from the smooth inner surface to the lowest point of the grooves. For such a film, about 27 peaks per centimeter of perimeter is preferred. This film can be curved into a cylinder as small as about 7.6 centimeters in diameter without substantially affecting the optical properties of the film. Light conduit 14 may be a single section or multiple sections joined together, as required by the particular application. In a preferred embodiment, light conduit 14 is approximately 10 centimeters (4 inches) in diameter and 30 m (100 feet) long.

In one embodiment of the invention, a light injector assembly 16 is disposed adjacent at least one end of light conduit 14 and cover 12 for directing light into light conduit 14. Light injector assembly 16 includes a case 18, which may be made of any suitably rigid, weatherable material, but is preferably of a metal, such as aluminum. Inside case 18 is a partially-collimated light source. As shown in FIG. 1, the light source includes a lamp 20 and a parabolic reflector 22. It will be appreciated, however, that other collimated light sources may be used.

Line light source 10 may optionally include an absorber 24 for absorbing highly uncollimated light, as disclosed in U.S. Pat. No. 5,258,896, which is incorporated herein by reference. Absorber 24 may be of any material and color that will absorb the light emitted by lamp 20. If, as often is the case, lamp 20 emits white light, absorber 24 is preferably flat black in color. Metallic absorbers painted flat black may be used. If, however, lamp 20 emits colored light, absorber 24 may be of any color that will absorb light of the color emitted by lamp 20.

In operation, light emanating from lamp 20 either directly enters the light conduit 14, or is reflected into it by reflector 22. If the line light source 10 includes an absorber 24, as discussed above, highly uncollimated light will be absorbed by absorber 24. The remaining light from the light injector assembly 16 is directed into the light conduit 14. Because the light conduit 14 operates on the principle of total internal reflection, the majority of light entering the light conduit 14 propagates down the length of the light conduit 14 without being absorbed or otherwise extinguished. Because the light conduit 14 is closed at each end, the only way light in the light conduit may escape is through leakage.

Light leakage from light conduit 14 occurs due to imperfections in the light conduit 14 such as anisotropy in materials, or flaws in construction. Light exiting a light conduit by leakage leaves the conduit at substantially the same angle of incidence as that at which it strikes the conduit. This is in contrast to the extraction of light from light conduits taught in the prior art, which rely on diffusers or extractors to significantly change the direction of light rays within the light conduit by scattering, so that the rays strike the light conduit inner surface at angles approaching normal incidence. Such techniques produce relatively small intensities when observed at angles near the axis of the light conduit, the opposite of the effect produced by the present invention.

High aspect ratio light conduits, light conduits having a much greater length than diameter, require highly collimated light sources such that the sections of the light conduit opposite the end of the light conduit having the light source will have sufficient light to emit from the light conduit. Highly collimated light sources facilitate light transport because light rays strike the walls of the light conduit less often, thereby lessening the emission of light from the light conduit and leaving more light available for light transport. The present invention further includes elements for increasing or decreasing the frequency at which light rays strike the inner wall of the light conduit, thereby improving the uniformity of brightness along the line light source.

Referring back to FIG. 1, the present invention further includes one or more lens elements, such as lens 30. Lens 30 preferably is a long focal length condenser lens, such as a long focal length Fresnel lens. While a Fresnel lens is preferred, other lenses well known in the art, such as regular continuous surface lenses or diffractive lenses may also be used. Other lenses, such as asymmetric lenses having power in only one axes or linear Fresnel lenses may also be used. Moreover, the focal length of the lens may vary depending on the application and length and diameter of the light conduit. Typically, focal lengths between one and fifteen feet (0.3 and 4.57 meters) are useful. For example, a Fresnel lens with a focal length of five feet would be preferred to dim a ten foot section of the light conduit. Lens 30 is preferably placed near the light source, and may even be placed within light injector assembly 16, such that collimated beam 34 from light source assembly 16 converges to point 36, preferably at the cross-sectional center of light conduit 14, and thereafter diverges. As used herein, the terms "converging" or "converges" shall be used in a relative sense. For example, a collimated beam passing through a convex lens, or a lens having positive power, "converges" in a relative sense after it passes through the lens, as the converging beam leaving the lens is converging relative to the collimated beam that entered the lens. Similarly, a diverging beam passing through a convex lens "converges" in a relative sense after it passes through the lens, even though, depending on the power of the lens, the beam leaving the lens may still be a diverging beam or a collimated beam. A collimated beam is a beam that has converged relative to a diverging beam. The convergence of the light from the collimated beam decreases the frequency that light rays strike the walls of light conduit 14, thereby facilitating dimming of the sections of the light conduit that are normally brighter than the rest of the light conduit, in other words, dimming the sections that are closer to the light source.

Figure 3:
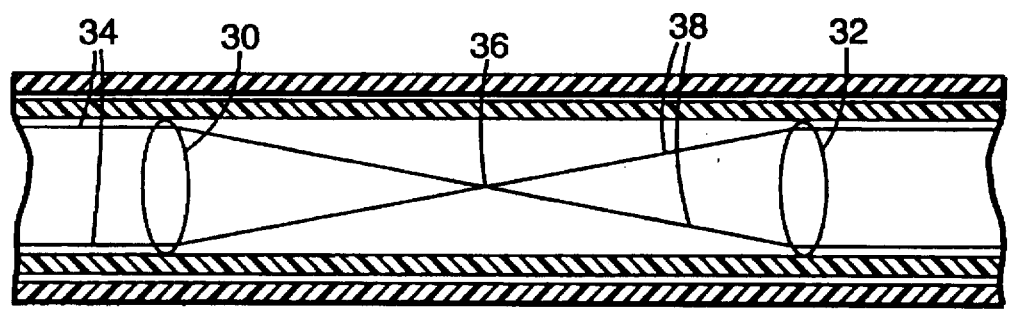
FIG. 3 shows a side cross-sectional view of a portion of the embodiment shown in FIG. 1, illustrating the behavior of light rays within the light conduit.

After point 36 where the light has converged, the light diverges and approaches the light conduit wall. The light will inappropriately brighten the light conduit, causing a bright ring around the light conduit, in the area where the diverging light strikes the inner wall. Therefore, in the present invention, it is preferable to include second condensing lens 32, as shown in FIG. 3, that converts divergent light 38 back to a collimated beam. The sections of the light conduit that follow second condensing lens 32 receive a collimated beam similar to prior art light conduits.

The placement of first and second condensing lenses, 30 and 32, respectively, may vary. First condensing lens 30 is preferably placed close to light injector assembly 16 such that lens 30 immediately causes the light entering the light conduit to converge. Second condensing lens 32 is placed such that the divergent light does not strike the walls of the light conduit. For example, for a 30 meter (100 foot) light conduit having a first condensing lens with a focal length of five feet, second condensing lens 32 may be placed anywhere between five and ten feet from first condensing lens 30. Thus, placement of first and second condensing lenses 30 and 32 in sections of light conduit 14 nearer light source assembly 16 prevents those sections from being too bright with respect to the later sections of the light conduit and preserves light through convergence of the light rays.

Figure 4:
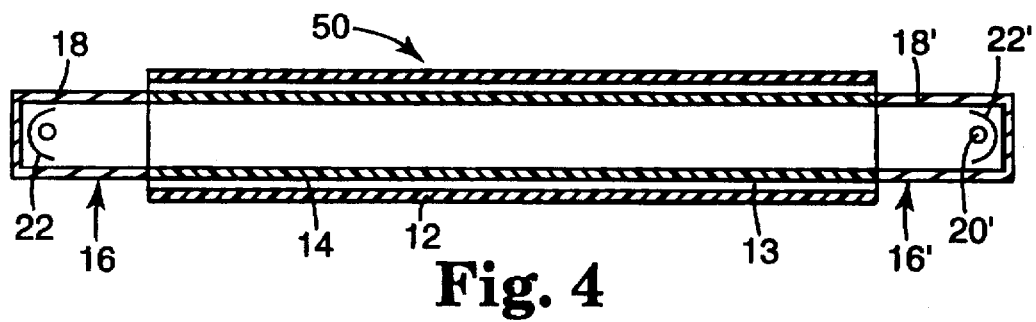
FIG. 4 shows a side cross-sectional view of a bi-directional line light source in which elements can be added to create different embodiments of the present invention.

FIG. 4 shows a bi-directionally dependent line light source 50 having a first light injector assembly 16 at a first end of light conduit 14 and a second light injector assembly 16' at a second end opposite the first end of light conduit 14. Bi-directionally dependent line light sources provide directional light leakage in two directions. Light originating from first light injector assembly 16 is emitted in substantially the same direction, and preferably substantially the same angle, as the direction or angle at which it approached the inner wall of the light conduit. As used herein, the term "in substantially the same direction" describes directional light leakage whereby most of the light emitted by the line light source is visible only to a viewer looking along the length of the line light source and toward the light injector assembly of the line light source. Similarly, because second light injector assembly 16' is located at the opposite end of light conduit 14 from first light injector assembly 16, light originating from second light injector assembly 16' is emitted in a direction substantially opposite the direction in which light originating from first light injector assembly 16 is emitted. Therefore, the type of lens elements chosen and placement of those lenses within light conduit 14 is critical to preserve uniformity of light emission in both directions.

Figure 5:
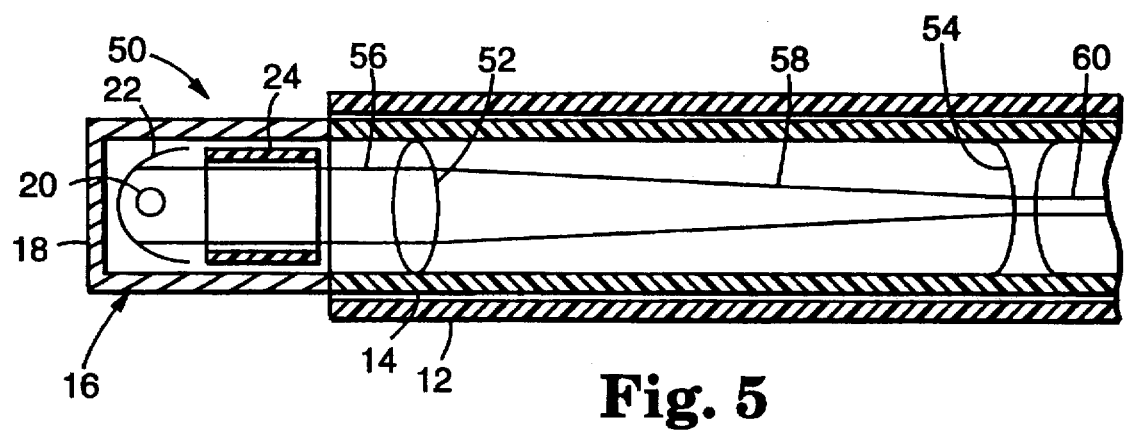
FIG. 5 shows a side cross-sectional view of another embodiment of the present invention.

FIG. 5 illustrates another embodiment of the present invention and shows a first end of bi-directional line light source 50. Bi-directional line light source 50 has a light injector assembly 16 having lamp 20, parabolic reflector 22 and an optional absorber 24 for injecting a collimated light beam into light conduit 14. Inside light conduit 14 is a first lens element 52, preferably a long focal length condenser lens, positioned near light injector assembly 16 for converging collimated light beam 56. A second lens element 54, preferably a negative lens is placed inside light conduit 14 inside the focal point of first lens element 52. For example, if first lens element 52 had a focal length of five feet, second lens element 54 would have a focal length of negative five feet. With respect to first light injector assembly 16, second lens element 54 recollimates converging light beam 58 such that collimated beam 60 is transported in the light conduit sections following second lens element 54. A similar lens assembly also is placed within light conduit 14 on the opposite end of bi-directional line light source 50 for second light injector assembly 16' shown in FIG. 4.

Figure 6:
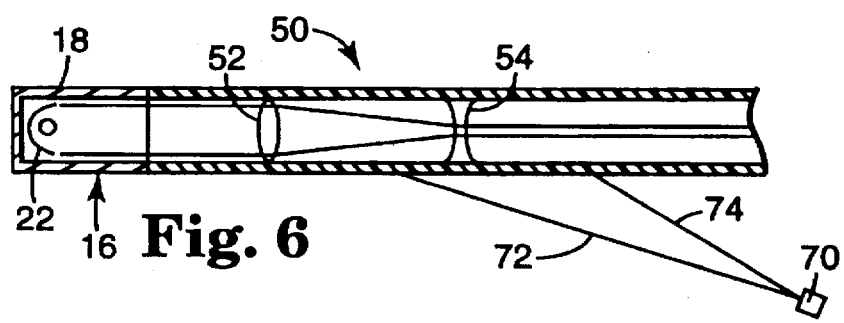
FIG. 6 shows a side cross-sectional view of the embodiment shown in FIG. 5, illustrating the emission of light from the light conduit.

Similar to the first embodiment of the invention shown in FIG. 1, placement of first and second lenses 52 and 54 in sections of light conduit 14 nearer light source assembly 16 prevents those sections from being too bright with respect to the later sections of the light conduit and preserves light through convergence of the light rays. Further, the beam of light exiting second lens 54 will be located more centrally in light conduit 14, thereby experiencing higher transport and less light emission. FIG. 6 shows the first end of bi-directional line light source 50 having light detector 70 positioned to receive light emitted from line light source 50 and originating from first light injector assembly 16. Emitted light 72, representing light emitted after light rays have passed through first lens 52 but before they have passed through second lens 54, has a reduced brightness level relative to the level of light that would be received by light detector 70 if the light had not passed through first lens 52. Similarly, emitted light 74, representing light emitted after the light rays have passed through both first and second lenses 52 and 54, also has a reduced brightness level relative to the level of light that would be received by light detector 70 if the light had not passed through first and second lenses 52 and 54. Thus, the lenses improve the uniformity of emitted light from the line light source to a viewer looking along the length of the line light source and toward the light source of the line light source by reducing the brightness level in sections closer to the light source.

Figure 7:
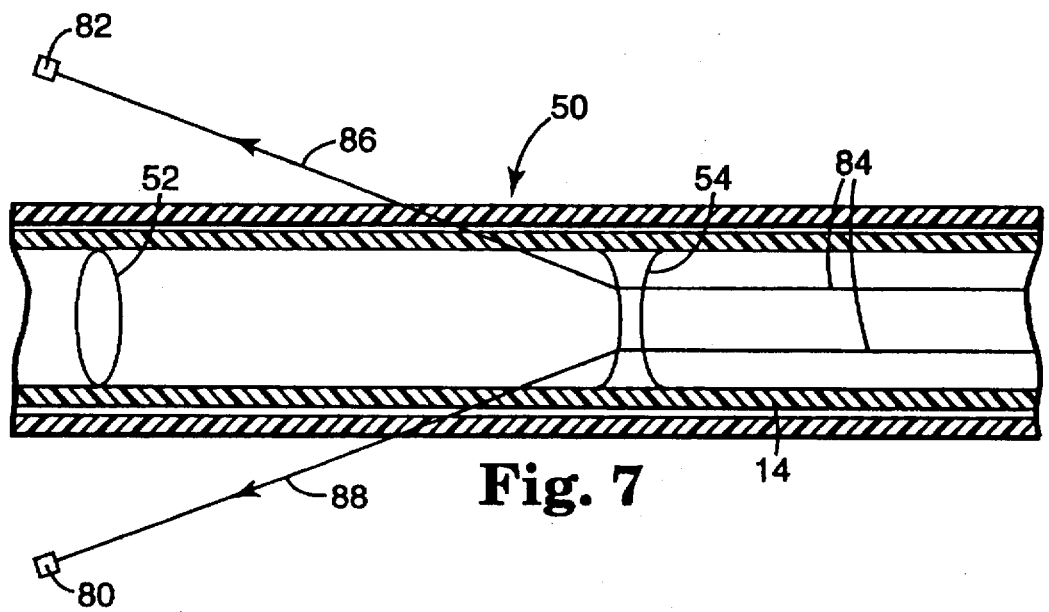
FIG. 7 shows a side cross-sectional view of a portion of the embodiment shown in FIG. 5, illustrating the behavior of light rays within the light conduit.

The embodiment as shown in FIG. 5 further improves the uniformity of emitted light by further increasing the emission of emitted light in sections of the light conduit furthest from the light injector assemblies. Similar to the light beam originating from first light injector assembly 16 as shown in FIG. 5, light originating from second light injector assembly 16' will converge from a first lens element and will recollimate to a collimated beam of light after passing through a second lens element. As shown in FIG. 7, collimated beam 84 has passed through a first and second lens element corresponding to second light injector assembly 16'. When collimated beam 84 passes through second lens element 54, it refracts into a diverging beam, such as emitted light 86 and 88, thereby increasing the frequency the light rays will strike the interior walls of light conduit 14 and increasing emitted light as detected by detectors 80 and 82 positioned along line light source 50 to receive light originating from second light injector assembly 16'. The section of light conduit 14 between first lens 52 and second lens 54 is the section of the light conduit that is typically dimmer with respect to light originating from second light injector assembly 16'. Thus, second lens 54 serves a dual purpose of increasing the amount of light transported from first light injector assembly 16 by recollimating converging light and increasing the amount of light emitted from second light injector assembly 16' by refracting the collimated beam into a diverging beam.

Figure 8:
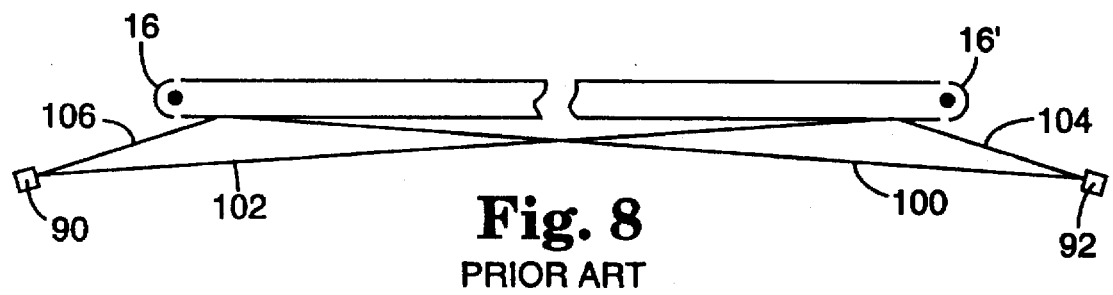
FIG. 8 is a schematic view of a prior art bi-directional line light source, illustrating light intensity levels emitted from various sections of the light conduit.
Figure 9:
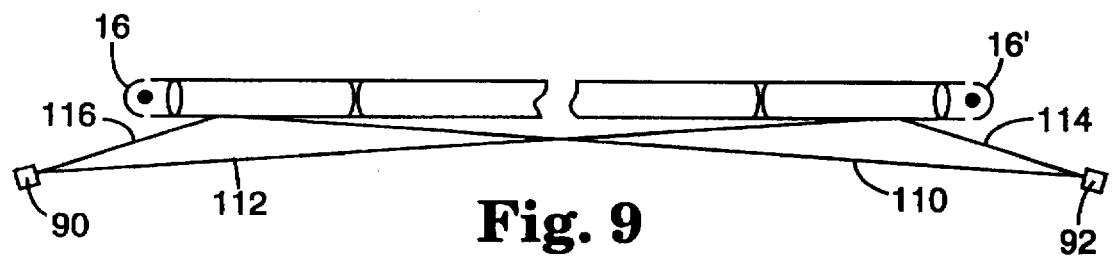
FIG. 9 is a schematic view of a bi-directional line light source of the present invention, illustrating light intensity levels emitted from various sections of the light conduit.

FIGS. 8 and 9 show a comparison of relative brightness for a prior art bi-directional line light source, as shown in FIG. 8 and a bi-directional line light source, such as the embodiment shown in FIG. 5, as shown in FIG. 9. Light detector 90 is positioned along the line light sources to receive light originating from second light assembly 16' and light detector 92 is positioned along the line light sources to receive light originating from first light assembly 16. In the prior art line light source, light emitted closer to the light sources, such as light rays 100 and 102 are brighter than light emitted further from the light sources, such as light rays 104 and 106. In FIG. 9, light ray 110, as detected by light detector 92, will be dimmer than light ray 100 and light ray 112, as detected by light detector 90, will also be dimmer than light ray 102. Conversely, light ray 114, as detected by light detector 92, will be brighter than light ray 104 and light ray 116, as detected by light detector 90, will also be brighter than light ray 106. Therefore, improved uniformity of brightness along the length of the light conduit has been achieved in the present invention by dimming the sections of the light conduit that were relatively bright with respect to the remainder of the light conduit and brightening the sections of the light conduit that were relatively dim with respect to the remainder of the light conduit.

As mentioned above, moisture and condensation along the inside of the light conduit, particularly near the light source, have caused problems in prior art light conduits. While sealing sections of the light conduit and filling the sections with dry gas can eliminate this problem, it has been necessary to apply anti-reflective coatings to the sealing windows to prevent light loss that would prevent the system from functioning properly. In the present invention, however, dry inert gas, such as dry nitrogen gas or dry argon gas, could fill sections of the light conduit between lens elements to eliminate the moisture and condensation problem. For example, in FIG. 3, dry nitrogen could fill light conduit 14 between lenses 30 and 32. To seal lenses 30 and 32, any sealer may be used, such a polyurethane or silicone cement. Similarly, in FIG. 5, dry gas could fill light conduit 14 between lenses 52 and 54. In both cases, the lenses serve the dual purpose of improving the uniformity of brightness along the light conduit and providing a sealing function for sealing the dry gas in sections of the light conduit without degrading the performance of the line light source.

FIG. 11 shows yet another embodiment of the present invention. In the embodiment shown in FIG. 11, optical devices, such as lenses, are placed inside the light conduit to slightly change the angular distribution of the light being transported within the light conduit. The slight change of the angular distribution changes the amount of light emitted from the line light source, thereby allowing placement of the optical devices to increase the emission of light in sections of the light conduit that would be relatively dimmer than the rest of the light conduit without the optical devices.

FIG. 10 shows sections of prior art line light source 100 having light injector assembly 16 at one end of line light source 100. Light injector assembly 16 feeds light into light conduit 14 and emits light rays at a plurality of angles with respect to the longitudinal axis of light conduit 14. For example, light ray 102 is emitted from light injector assembly 16 at a greater angle with respect to the longitudinal axis than light ray 104. In other words, light ray 104 is more parallel to the longitudinal axis than light ray 102. Because light ray 102 travels through light conduit 14 at a greater angle than light ray 104, light ray 102 strikes the inner wall more often than light ray 104 does in sections of light conduit 14 closer to light injector assembly 16.

As light rays 102 and 104 strike the inner wall of light conduit 14, a portion of the light ray is emitted from light conduit 14 and a portion is transported through total internal reflection. Because light ray 102 strikes the inner wall more often than light ray 104 in sections of light conduit 14 closer to light injector assembly 16, more light from light ray 102 is emitted from light conduit 14 in those closer sections. Therefore, when emitted from light injector assembly 16 at great enough angles, light ray 102 will be mostly depleted as it reaches sections of light conduit 14 further from light injector assembly 16, such as section 112, and may be substantially completely depleted in section 114. Light ray 104, on the other hand, having had fewer reflections off the inner wall of light conduit 14, will still exist at far ends of light conduit 14, such as in section 114, but will still be traveling at an angle more parallel to the longitudinal axis of light conduit 14. Due to this low angle, very little of light ray 104 will be emitted from light conduit 14 because light ray 104 will rarely strike the inner walls of light conduit 14.

In the embodiment shown in FIG. 11, a refractive element has been introduced within the light conduit to improve the uniformity of light emitted along the length of the line light source. Line light source 120 has light injector assembly 16 at a first end of light conduit 14 and may have a similar light injector assembly at the opposite end of light conduit 14 if a bi-directional line light source is desired. Refractive element 121, such as a negative lens, is placed within light conduit 14, preferably in sections of light conduit 14 further from light injector assembly 16, to slightly change the angular distribution of incident light. As used herein, the term "slight change in angular distribution" shall mean changes in angular distribution of greater than zero degrees and less than five degrees. For example, in a light conduit having a diameter of 10 cm (4 inches), a negative 7.6 meter (25 foot) focal length lens would change the angular distribution by approximately 23 minutes. In a bi-directional system, however, it is preferable to place refractive element 121 in the middle of light conduit 14, equidistant from both light injector assemblies, such that it will effectively perform a improved uniformity of light emission function for light originating from both light assemblies. Alternatively, a composite lens, wherein different portions of the lens produce different changes in angular distribution, such that light exiting the composite lens will have undergone varying changes in angular distribution, may also be used for refractive element 121.

In FIG. 11, light injector assembly 16 feeds light into light conduit 14 and emits light rays at a plurality of angles with respect to the longitudinal axis of light conduit 14. For example, light ray 122 is emitted from light injector assembly 16 at a greater angle with respect to the longitudinal axis than light ray 124. As mentioned above, because light ray 122 is emitted at a greater angle, when it reaches sections further from light injector assembly, such as section 132, it may have been substantially completely emitted from light conduit 14. Conversely, because light ray 124 was emitted at such a shallow angle with respect to the longitudinal axis, only a small portion of light ray 124 has been emitted from light conduit 14 when light ray 124 reaches section 132. To increase the amount of light emitted from light conduit 14 from light ray 124, refractive element 121 is introduced into section 132. Refractive element 121 slightly changes the angular distribution of light passing through it, thereby increasing the frequency that light ray 124 will strike the inner walls of light conduit 14 and increasing the light exiting light conduit 14 from light ray 124. Refractive element 121 facilitates efficient use of light by increasing the exitance of light in sections of light conduit 14 following refractive element 121 because the remaining available light, although lower in intensity than in earlier sections of the light conduit, is emitted at a higher rate of emission. The higher rate of emission thus improves uniformity by increasing the brightness of the normally dimmer sections of the light conduit.

Figure 12:
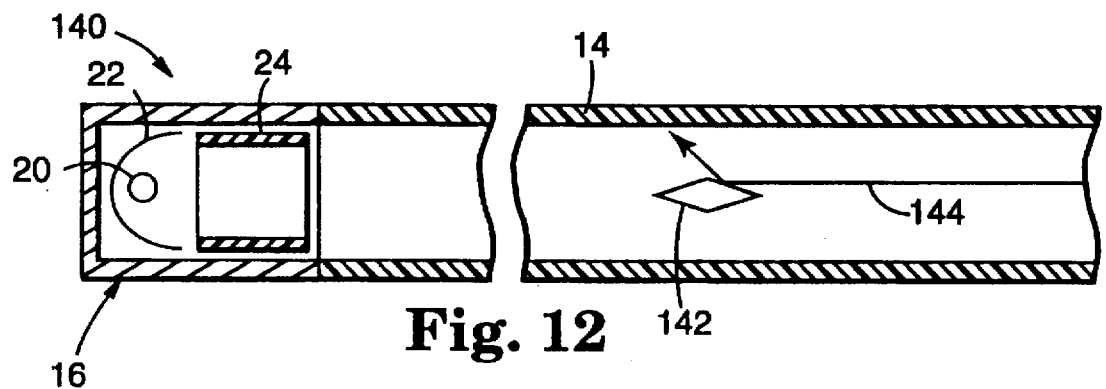
FIG. 12 is a side cross-sectional view of yet another embodiment of the present invention, and further illustrates the behavior of light rays within the line light source.

FIG. 12 shows yet another embodiment of the present invention, wherein a reflective element is introduced midway within the light conduit to improve the uniformity of light emitted along the length of the line light source by slightly changing the angular distribution of incident light. Reflective element 142 is placed within bi-directional line light source 140 having first light injector assembly 16 and second light injector assembly (not shown). Light ray 144 is a light ray emitted from the second light injector assembly at a shallow angle with respect to the longitudinal axis of light conduit 14. Reflective element 142 may be a long, narrow double wedge or cone of reflective material mounted in the center of light conduit 14 or any other shape that would slightly change the angular distribution of incident light upon striking the reflective surface of reflective element 142. Reflective element 142 may be made of any specularly reflective material, such as aluminum or chrome.

Moreover, reflective element 142 may be made of a polished plastic, as the polished air/plastic interface would specularly reflect much of the incident light that strikes it at such high incident angles. While two optical devices have been described above that function to slightly change the angular distribution of incident light, those skilled in the art will readily recognize that other optical devices could also perform the same function and are contemplated by the present invention.

Figure 13:
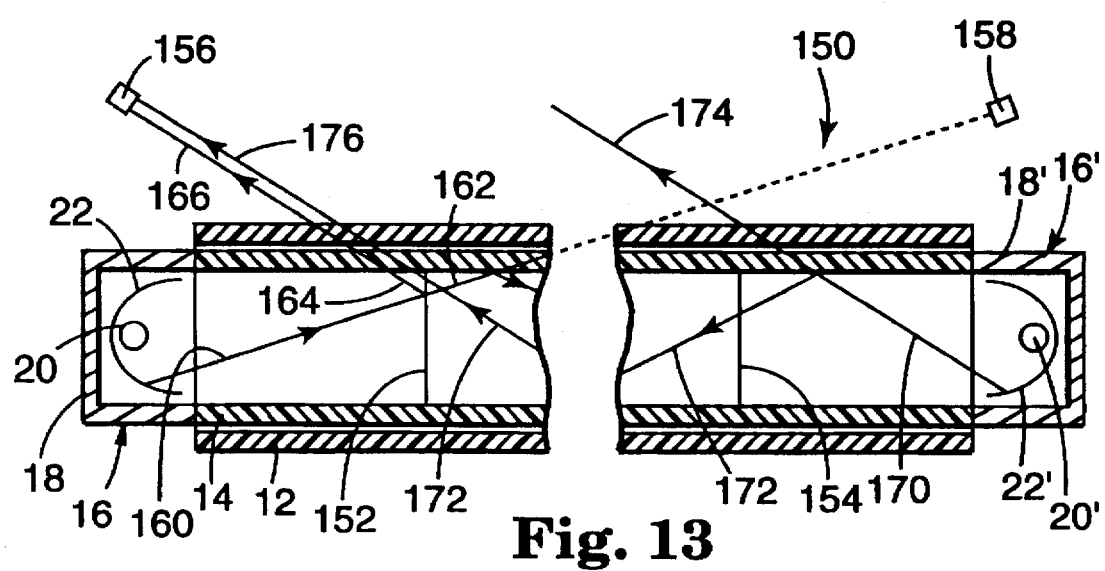
FIG. 13 is a side cross-section view of an embodiment of the present invention, and further illustrates the behavior of light rays within the line light source and the emission of light from the line light source.

FIG. 13 shows yet another embodiment of the present invention for improving the uniformity of brightness along the length of a line light source. Bi-directional line light source 150 has first light injector assembly 16 at a first end of light conduit 14 and second light injector assembly 16' at a second end of light conduit 14. Line light source 150 has first partial reflector 152 on the first end of light conduit 14 and second partial reflector 154 on the second end of light conduit 14. First and second partial reflectors 152 and 154 partially reflect incident light and transmit the remaining light at substantially the same angle as the angle at which it approached the partial reflector. Partial reflectors 152 and 154 can provide specular reflection, such as from a polished air/glass interface or a polished air/polycarbonate interface. Such a polished interface can produce approximately four percent reflection of incident light. The portion of reflected light can be increased by coating portions of the transmissive material, such as glass or polycarbonate, using reflective materials such as silver or aluminum. Vapor depositing a thin layer of reflective material, on the order of a few Angstroms, on glass would produce a beamsplitter capable of reflecting higher percentages of light. Alternatively, the glass could be patterned with a reflective patterned grid, concentric reflective circles or other patterns to partially reflect incident light. The coated window will then transmit light that strikes non-coated portions of the partial reflector and will reflect light that strikes coated portions of the partial reflector. The percentage of light that is transmitted or reflected by partial reflectors 152 or 154 will depend on how much surface area of the window the reflective material covers. Also, holes could be placed in polished glass to reduce the specular reflection from four percent. A preferred range of reflected light would range between two and ten percent of incident light.

Referring again to FIG. 13, first light injector assembly 16 emits light, such as light ray 160. When light ray 160 strikes partial reflector 152, a portion of light 162 is transmitted through partial reflector and a portion of light 164 is reflected. Light conduit 14 continues to transport and to emit transmitted portion of light 162 along the length of light conduit 14 toward second light injector assembly 16'. The direction of travel of reflected portion of light 164, however, is changed due to the reflection, and will travel in the opposite direction, namely toward first light injector assembly 16. When reflected portion of light 164 strikes the inner wall of light conduit 14, a portion of light will be emitted from light conduit 16. Emitted light 166 is received by light detector 156.

Light ray 170 is emitted from light injector assembly 16' and transmitted portion of light 172 that passed through second partial reflector 154 is transported down light conduit 14 by total internal reflection. Because some light is emitted from light conduit 14 each time transmitted portion of light 172 strikes the inner wall of light conduit 14, when transmitted portion of light 172 reaches sections of light conduit 14 further from second light injector assembly 16', the intensity of the light has decreased. Thus, when some of transmitted portion of light 172 is emitted from light conduit 14 as emitted light 176, its intensity is not as high as light that was emitted closer to second light injector assembly, such as light ray 174. Because the intensity of emitted light is higher for light emitted closer to second light injector assembly 16' for light detector 156, line light source 174 has a non-uniform brightness along the length of light conduit 14. The present invention, however, provides supplemental emitted light in the form of emitted light 166 originating from reflected light 164. This supplemental emitted light increases the intensity of emitted light in the section of light conduit 14 between first light injector assembly 16 and first partial reflector 152 with respect to light detector 156 to improve uniformity. Second partial reflector 154 similarly provides supplemental emitted light with respect to light detector 158.

Similar to the embodiments shown in FIGS. 3 and 5, dry gas, such as dry nitrogen gas, could fill sections of the light conduit, such as between light injector assembly 16 and partial reflector 152 to eliminate the moisture and condensation problem. The partial reflectors can serve the dual purpose of improving the uniformity of brightness along the light conduit through partial reflection and providing a sealing function for sealing the dry gas in sections of the light conduit without degrading the performance of the line light source.

Although a preferred embodiment has been illustrated and described for the present invention, it will be appreciated by those of ordinary skill in the art that any method or apparatus which is calculated to achieve this same purpose may be substituted for the specific configurations and steps shown. This application is intended to cover any adaptations or variations of the present invention. Therefore, it is manifestly intended that this invention be limited only by the appended claims and the equivalents thereof.

What is claimed is:

1. A bi-directional dependent line light source, comprising:

a hollow light conduit having an interior side and a first end and a second end with a longitudinal axis running therebetween, said light conduit being longer in length than in cross sectional width, comprising a thin film of a totally internally reflecting material;

a first illumination source directed into said first end of said light conduit;

a second illumination source directed into said second end of said light conduit;

first partial light reflecting means for specularly reflecting a portion of incident light and for transmitting a portion of incident light, said first partial light reflecting means placed within said hollow light conduit closer to said first end than said second end of said light conduit; and second partial light reflecting means for specularly reflecting a portion of incident light and for transmitting a portion of incident light, said second partial light reflecting means placed within said hollow light conduit closer to said second end than said first end of said light conduit.

2. The bi-directional dependent line light source according to claim 1, wherein said first and second partial light reflecting means specularly reflect between two and ten percent of incident light.

3. The bi-directional dependent line light source according to claim 1, wherein said first and second partial light reflecting means are polished glass.

4. The bi-directional dependent line light source according to claim 1, wherein said first and second partial light reflecting means are polished polycarbonate.

5. The bi-directional dependent line light source according to claim 1, wherein said first and second partial light reflecting means are beamsplitters.

6. The bi-directional dependent line light source according to claim 1, wherein said first and second partial light reflecting means are sealably attached to said interior side of said light conduit, and further comprising dry gas filling space within said light conduit between said first partial light reflecting means and said first illumination source and between said second partial light reflecting means and said second illumination source.

7. A bi-directional dependent line light source, comprising:

a hollow light conduit having an interior side and a first end and a second end with a longitudinal axis running therebetween, said light conduit being longer in length than in cross sectional width, comprising a thin film of a totally internally reflecting material;

a first illumination source directed into said first end of said light conduit;

a second illumination source directed into said second end of said light conduit;

first supplemental light means for providing supplemental emitted light to supplement light originating from said first illumination source, said supplemental emitted light originating from said second illumination source; and second supplemental light means for providing supplemental emitted light to supplement light originating from said second illumination source, said supplemental emitted light originating from said first illumination source.

* * * * *